(No Model.) 3 Sheets—Sheet 1.
J. R. STOUT & W. N. HARTSHORN.
METHOD OF AND MACHINE FOR COATING CHOCOLATES.
No. 576,235. Patented Feb. 2, 1897.
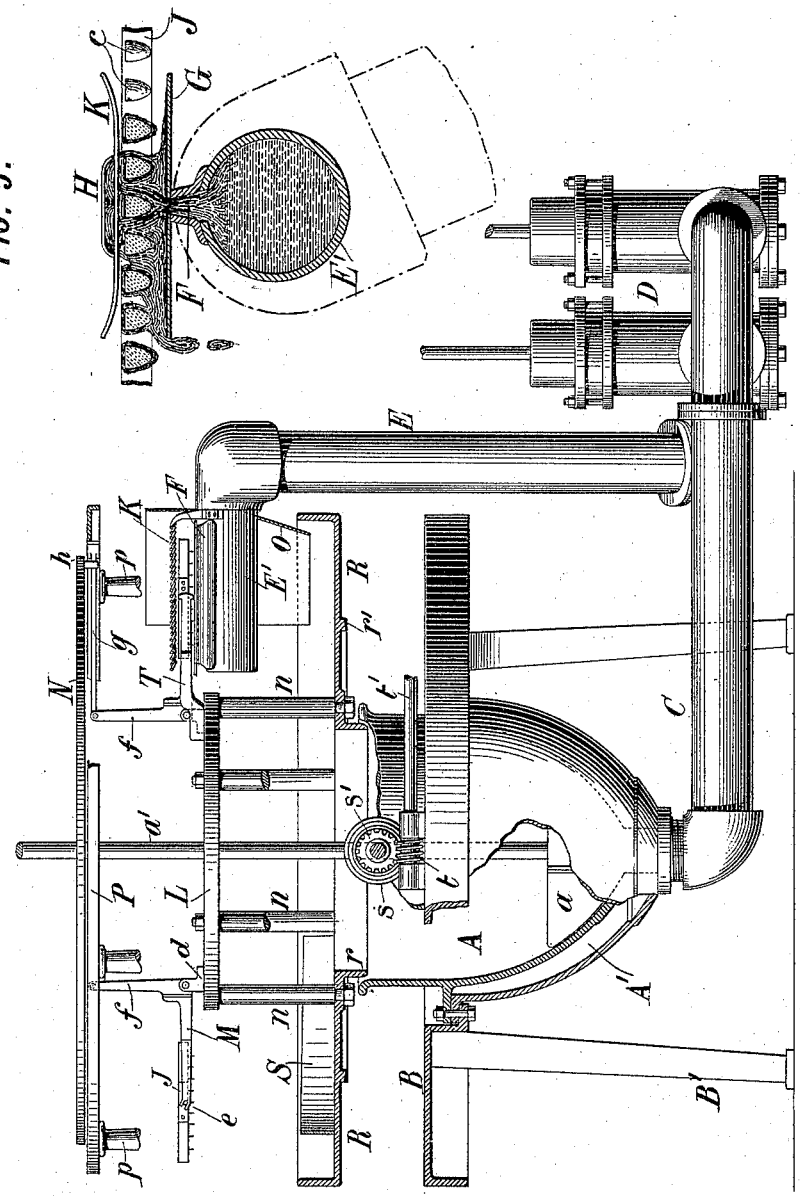
WITNESSES:
Fred White
Thomas F. Wallace
INVENTORS:
John R. Stout and
Willis N. Hartshorn,
By their Attorneys,

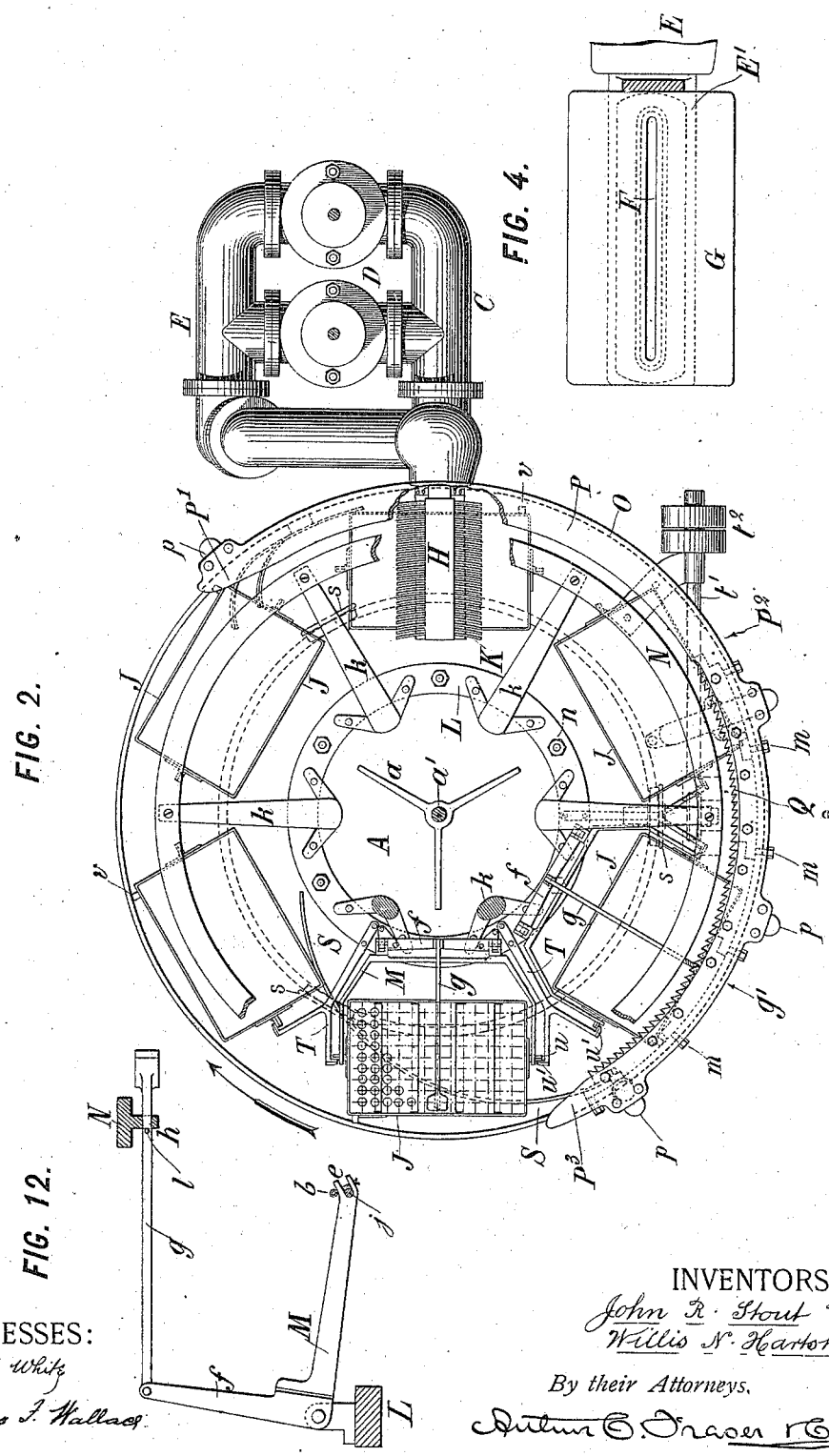

(No Model.) 3 Sheets—Sheet 3.
J. R. STOUT & W. N. HARTSHORN.
METHOD OF AND MACHINE FOR COATING CHOCOLATES.
No. 576,235. Patented Feb. 2, 1897.
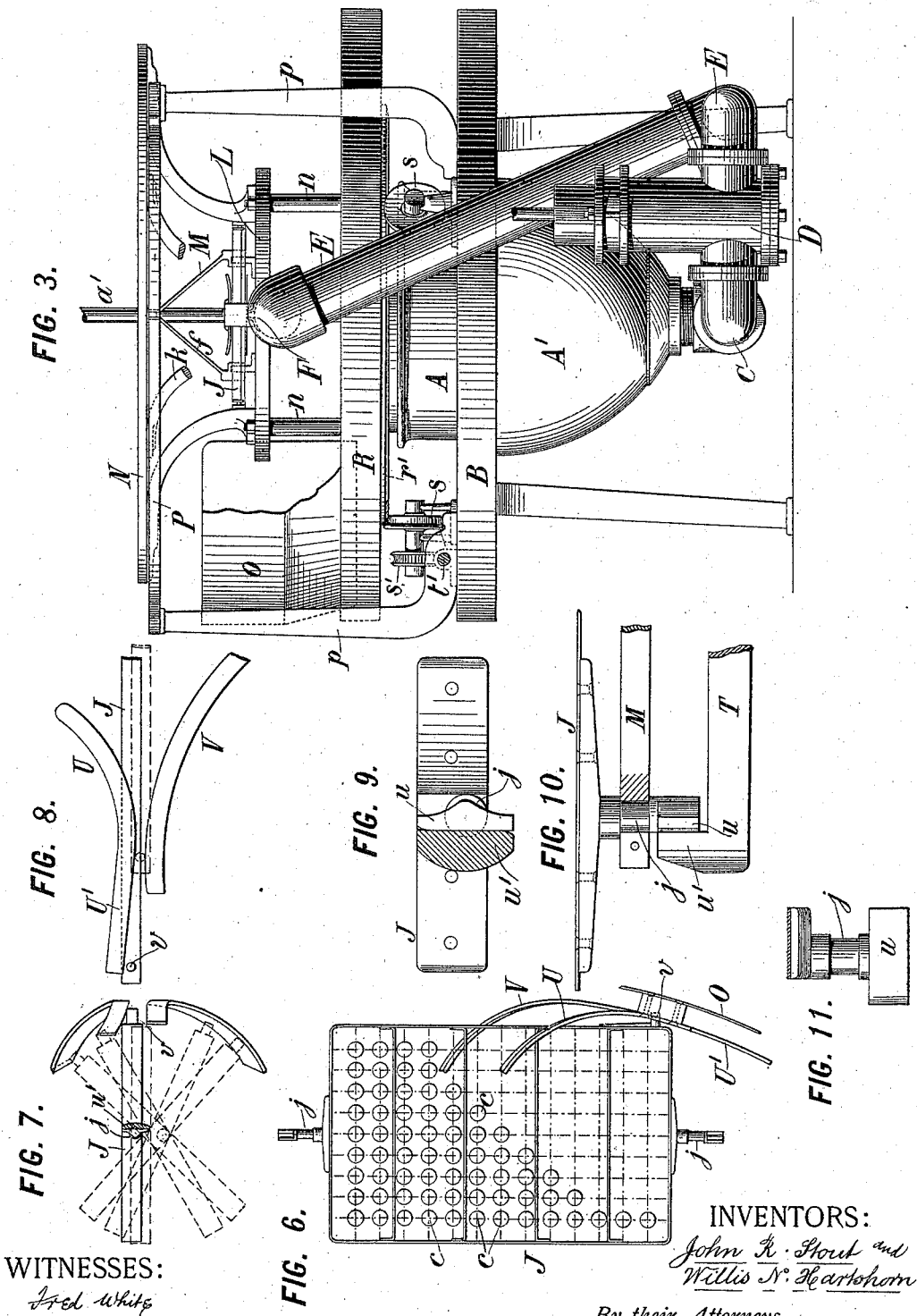

UNITED STATES PATENT OFFICE.

JOHN R. STOUT AND WILLIS N. HARTSHORN, OF BROOKLYN, NEW YORK.

METHOD OF AND MACHINE FOR COATING CHOCOLATES.

SPECIFICATION forming part of Letters Patent No. 576,235, dated February 2, 1897.

Application filed July 9, 1896. Serial No. 598,527. (No model.)

*To all whom it may concern:*

Be it known that we, JOHN R. STOUT and WILLIS N. HARTSHORN, citizens of the United States, and residents of Brooklyn, in the county of Kings and State of New York, have invented certain new and useful Improvements in Methods of and Machines for Coating Chocolates, of which the following is a specification.

This invention provides a new process and machine for coating bonbons, cream drops, or other such confections with the chocolate covering or other coating material therefor.

In the making of chocolate cream drops and other similar confections the drop or core or center is coated with the covering material, usually of chocolate, which material is of the consistence of a thick cream, by either, first, rolling the core in the coating material, as is usual in hand-coating, or, second, immersing the core in the coating material and then lifting it out and draining or jarring off the excess of coating. In either case the confection is then placed right side up on a sheet of paper, tin, or other receptacle. Mechanical means for coating or for facilitating the coating of cream drops, &c., have heretofore operated on the principle of immersing the core in the coating preparation.

Our invention provides a new machine for this purpose which operates on a novel principle, namely, by passing the cores through a stream of the coating material, whereby the cores without being dipped into the material or given any descending movement whatever are nevertheless immersed in the material, which fills the spaces between the cores and comes into contact with every portion of the exterior of each core, so that the cores become as thoroughly coated with the material as if they were plunged into it. The excess of coating material is subsequently permitted to drain off or is disengaged by jarring the tray or support by which the cores are carried.

The machine which we have devised for carrying out the above-described process of coating comprises in general a vessel or kettle containing the bath of semiliquid chocolate or other coating material, a pump for drawing this material therefrom and forcing it to a nozzle, by which it is directed in a stream, a series of trays or carriers for holding the cores to be coated, and mechanical means for causing these trays to travel past the said nozzle. Preferably the nozzle directs the stream upwardly. A top plate is provided to spread it out, a bottom plate is arranged to prevent its immediate discharge, and the trays are caused to travel between the two plates. The preferred form of machine embodying these features is illustrated in the accompanying drawings, wherein—

Figure 1 is a side elevation of the machine, partly in vertical mid-section. Fig. 2 is a plan of the machine, partly broken away in horizontal section. Fig. 3 is an end elevation of the machine, partly broken away for greater clearness. Fig. 4 is a plan of the nozzle and lower plate. Fig. 5 is a transverse section of the nozzle and upper and lower plates, showing the tray of cores traveling between the plates in the operation of coating. Fig. 6 is a plan of one tray on a larger scale and of the guides for insuring its entry in proper horizontal position between the plates or guides of the coating device. Fig. 7 is an end elevation of the tray and guides, illustrating the operation of the latter. Fig. 8 is a side elevation of the tray and guides viewed from the right in Fig. 6. Figs. 9, 10, and 11 are detail views, on a still larger scale, showing the pivotal construction of one end of one of the trays, Fig. 9 being an end view of the opposite end from that shown in Fig. 7, Fig. 10 being a plan view, and Fig. 11 a transverse section. Fig. 12 is a side elevation of one of the levers M.

We will proceed to describe the particular construction shown in the drawings, remarking, however, that our invention is not limited to this construction, but may be widely varied therefrom within the essential limits, which will be defined in our claims.

Let A designate a kettle or receptacle of any suitable shape or construction adapted to contain semiliquid chocolate or other coating material. It is usual to provide such a vessel or kettle with a jacket A', to which steam or other heating fluid may be admitted for keeping the chocolate at a proper temperature. It is usual to provide a stirrer $a$ in the bottom of such a chocolate-receptacle to keep the chocolate stirred and maintain it homogeneous. The stirrer $a$ may be fixed on the lower end of a central vertical shaft $a'$, which may be revolved at suitable speed by any desired means. The vessel A may be supported in any suitable way, as, for example, by being mounted within an annular table B, which is supported on legs B'.

From preferably the bottom of the vessel A leads a pipe C, which extends to a pump D, which may be of any suitable construction, being preferably a double-acting plunger-pump adapted to draw the chocolate from the vessel A through the pipe C and to expel it through a pipe E, which extends upward and then branches horizontally at E' and which is formed with a prolonged nozzle F on the upper side of this horizontal branch. The shape preferred for the nozzle F is shown in Fig. 4. The nozzle coincides in position with an opening of like shape in a horizontal plate G, Figs. 4 and 5. Over the plate G and directly over the nozzle is a deflecting top plate H, Figs. 2 and 5. This plate H is arranged to receive the stream of chocolate which is forced up through the nozzle and prevents this stream gushing up too high and flattens or spreads it out on both sides. Preferably it is made with its opposite edges turned downwardly, so that its under side is concave, these edges serving to deflect the stream of chocolate downward on top of the cores.

The cream centers, cones, or cores are shown at $c\ c$, Figs. 5 and 6. They are supported in suitable skeleton cups or recesses in a tray or frame J. Several constructions of such trays are already known, being called "chocolate-dippers" or "dipping-trays," and being commonly used for the holding of the cream centers or cores while dipping or immersing them in the bath of the chocolate-coating material. Any such construction of tray may be used in connection with our machine by properly proportioning and adapting it thereto, but we prefer the construction set forth in our application for patent for "Device for dipping chocolates," filed June 3, 1896, Serial No. 594,115.

To prevent the cores being floated up out of their skeleton cups or holders by reason of the upward flow of the stream of chocolate issuing from the nozzle F, we provide a grating K over the plate G, and at such level as to come directly above the dipping-tray J, and hence to restrain the cores from lifting. The grating K consists, preferably, of parallel wires extended in the direction of travel of the tray. The wires may be fastened to the plate H or otherwise.

Some suitable means is provided for propelling the tray, and preferably a succession of trays, through the space between the plate G and nozzle F beneath and the plate H and grating K above. Numerous constructions might readily be devised for this purpose, but for a machine of the capacity illustrated we prefer the construction shown. According to this construction six trays or any other convenient number are arranged circularly to swing around a central axis. In the construction shown this axis coincides with that of the central shaft $a'$. A suitable turn-table L is provided, preferably in the form of a flat ring, which is suitably mounted and is caused to revolve at a proper speed, say, for example, with six trays at a speed of one revolution in ninety seconds. Each tray J is supported pivotally upon a lever M, and the respective levers M M are fulcrumed on pivot-brackets $d$, fixed on the turn-table L. Each tray J has a pivot $j$ at each end, as shown in Fig. 6, and each lever M is formed with two arms extending around the opposite ends of the corresponding tray and there forked, as shown at $e$ in Fig. 1, to receive the pivots of the tray. Fig. 12 shows the forked end $e$ on a larger scale, and shows a pin or cotter $b$ for preventing accidental escape of the pivot. Each lever M is an elbow-lever having the two horizontal arms already referred to, and having also an upwardly-projecting arm $f$. The latter is constructed, preferably, as shown in Fig. 3, by means of two oblique members extending from opposite sides and coming together at the top, at which point the arm $f$ is jointed to a rod $g$, which extends radially and horizontally outward, its outer end being freely supported by passing through a loop or eye $h$, Fig. 12, which is fixed beneath an overhead ring N. This ring N is mounted upon the turn-table L through the medium of brackets $k\ k$, and consequently turns with the turn-table. Obviously as the arm of the lever which carries the tray moves up and down the rod $g$ must move in and out.

A stop is provided to limit the outward movement of the rod $g$, and consequently the downward movement of the tray J. The stop consists of a pin $l$, which encounters the loop $h$, as shown in Fig. 12. By pushing in the outer end of the rod $g$ the lever M will be turned so as to raise the tray. To accomplish this result, a cam P is provided, which is of the general form of an arc-shaped strip extended about half-way around the circumference, as shown in Fig. 2, and located at such height as to act upon the outer ends of the rods $g\ g$ of the several tray-carrying levers. At the entering end P' this cam is formed with an incline approaching the center, which pushes in the rod $g$ and thereby raises the tray to the proper height to enter between the plate G and grating K. From the termination of this incline the cam P has a concentric surface until the point $P^2$ is reached, where the surface drops away and discloses a secondary cam Q, formed with a series of teeth arranged to be engaged by the ends of the rods, as shown at the point $g'$ in Fig. 2. The effect of these teeth as the tray is revolved is to engage the rod $g$ of each tray, push it in, so as to lift the tray, and release it and permit it to fall out, so as to drop the tray. By this means the trays are repeatedly and rapidly jarred in order to shake off any excess of the chocolate coating from the candies. The cam Q is constructed, preferably, as a plate made in sections arranged beneath the cam P and supported thereby and provided with adjusting-screws $m\ m$, by which the sections may be set out or in to bring them to the exact operative position. The rod $g$ on running off the end of the cam Q drops onto a terminal portion or incline $P^3$ of the cam P, which permits the rod to move slowly outward, thereby slowly lowering the tray until its further movement is arrested by the contact of the stop-pin $l$ on the rod $g$ with the loop $h$, which serves as a stop. From this point around to the entering end $P'$ of the cam the trays are supported on the levers M in their lowermost positions, as shown in Fig. 12. The cam P is supported at suitable intervals on upright pillars or arms $p$, Fig. 3, which are fixed to the stationary table B.

The turn-table L and the parts supported by it may be mounted rotatively in any suitable manner. In the construction shown this turn-table is supported by posts $n$ upon a revolving circular table R, which has a large central opening formed with a downward flange $r$, which enters just within the rim of the chocolate vessel A. The chocolate which is jarred off from the candies, as well as that which overflows from the plate G, falls on the table R and is returned to the vessel A by means of a spiral blade or scraper S, which is stationary, being fastened to one of the posts $p$, or otherwise attached, and so shaped that as the table R turns beneath it it pushes the chocolate toward the central opening thereof.

To prevent the chocolate which overflows from the plate G and which falls from the trays from dropping or being spattered outside of the table R, we provide a guard or screen O (shown in cross-section in Fig. 1) and which extends, preferably, coincidently with the cam P. In Fig. 3 this guard is partly broken away to avoid obscuring the central parts. In the construction shown the table R is formed on its under side with a rail $r'$, which is supported on three conical rollers $s\ s$. (Shown in dotted lines in Fig. 2 and in full lines in Fig. 3.) Two of these rollers may be idlers, the third being a driving-roller and being fixed on the same shaft with a worm-wheel $s'$, which is driven by a worm $t$ on a revolving shaft $t'$, Fig. 1, which shaft may be provided with driving-pulleys $t^2$, Fig. 2. The wheel $s$ drives the table frictionally; but if a more positive movement is desired a circular rack may be provided in the under side of the table, and a cog-wheel may be fixed on the same shaft with the worm-wheel $s'$ and caused to engage the said rack.

The operation may now be understood.

In starting the machine the vessel A is filled with the proper quantity of the semiliquid chocolate or other coating preparation, and the pump D is started and operated until the pipes C and E and the pump-cylinders are filled with the chocolate and until a regular and uniform stream is found to issue from the nozzle F. Power being applied to drive the shaft $t'$, a rotary motion is thus imparted to the table R, turn-table L, levers M M, and trays J J. The trays by being pivoted upon the levers M may be turned either side up. The trays as they pass around the open space between the releasing part $P^3$ and the entering part $P'$ of the cam are filled with the cream centers or cores to be coated. This is done in the way well understood in the art by having these cores or cones previously placed in proper positions right side up on a plate, bringing this plate beneath one of the inverted trays J, raising it so that the respective cores or cones enter the sockets provided for them in the tray J, and then swinging the tray and plate together to bring the tray right side up, whereupon the plate is lifted off. The operator should then guide the filled tray to keep it approximately horizontal until it reaches the entering position. It is guided into the casing by the means which we will presently describe. The tray is guided to a horizontal position and is then lifted by the action of the cam-incline $P'$ on the rod $g$, whereby the tray is brought to the exact level required to enable it to accurately enter the space between the plate G and grating K. In traveling through this space the ascending stream of chocolate flows up around the cores and, being diverted and caused to flow laterally by the plate H, the chocolate flows over the flat upper sides or bases of the inverted cores. The mass of chocolate which flows up from the nozzle and is confined between the plates H and G fills the spaces between the cores and flows along over the plate G with the moving cores and finally drops off from the edge of the plate, all as indicated in Fig. 5, falling onto the table R.

The cores in passing through the stream of chocolate are partially lifted thereby, so that they float in the chocolate, which enters between the surfaces of the cores and the supporting-bars of the skeleton cups or holders in the tray, thereby producing the same effect as when a tray of cores suitably covered over is forced down into a bath of chocolate. This operation avoids the leaving of any bare or naked spaces on the candies where the cores were supported by the skeleton bars of their sockets. As the cores are carried by the movement of the tray beyond the plate G they are thoroughly coated with chocolate, and in the case of a thick viscid preparation of chocolate it becomes necessary to jar the tray violently and repeatedly in order to shake off the excess of coating. It is for this purpose that the serrated cam Q is provided. The trays turn until the point P² is reached, whereupon each tray is dropped until the cam Q engages its rod g, whereupon the tray is abruptly lifted and then dropped a short distance and again lifted and dropped, this operation being repeated as many times as there are teeth on the cam Q. One or more sections of the cam Q can be removed, if desired, in order to shorten the period during which the jarring takes place. Finally the jarring ceases and the tray is gently lowered by the terminal incline P³ of the cam P. An operator then places a suitable receptacle, as a sheet of paper supported by a sheet of tin, for example, over the tray and inverts it by turning it on its pivots, whereupon the coated confections drop out of the recesses of the tray and rest upon the plate, which the operator then carefully lowers and carries away, leaving the tray empty. The empty tray in passing to a further position is then refilled with cores to be coated, as first described, and then turned right side up and guided again into the entering portion of the machine. Ordinarily two operators are required, one for filling the trays and the other for emptying them.

It is highly desirable that some means be provided for insuring that the trays J J shall remain in a horizontal position from the time when the newly-filled tray is released by the operator to the time when the tray with its coated confections is ready to be emptied. As a suitable construction for accomplishing this result we have provided for each tray a system of parallel-motion guides. (Shown best in Figs. 9, 10, and 11.) The pivots j, which are applied to the opposite ends of the tray J, Fig. 6, are extended outwardly and formed each with a cross-head u, which stands vertically when the tray is horizontal. The outer or working face of this cross-head slides against the vertical working face of a guide u', formed on the end of a bracket T, which is fixed to the turn-table L. A bracket T is provided between each two trays J J, the bracket being forked at its outer part, and each of these forks carrying one of the guides u'. Thus each tray is provided with two guides u', one at each end, to engage the two cross-heads u on its pivots. As the trays are moved up and down by the toothed cam Q acting, through the levers M, upon their pivots the cross-heads u u slide against the guides u' and thereby prevent any turning or tilting of the trays which would bring them out of the horizontal position.

For guiding the trays properly into horizontal position and for guiding them while they are being lifted by the action of the cam-incline P' we have provided the construction shown best in Figs. 6, 7, and 8. Each tray is provided with a pin v on its outer side. The tray moves in a direction from right to left in Fig. 8, and in so doing the pin v moves between two widely-divergent guides U and V. These not only diverge, as shown in Fig. 8, but at their approaching ends are bent inward, as shown in Fig. 6. Their shape is such that no matter to what angle the tray J may be tilted (within certain limits) its pin v will be engaged by one or other of the guides as the tray advances, and by reason of the inclination of the guide the pin will be brought to the position shown in dotted lines in Fig. 8, thereby bringing the tray to the horizontal position. It is brought to this position just before the cam-incline P' begins to lift the tray. During the lifting which this cam imparts to the pivots j of the tray the pin v is moving against an inclined extension U', Fig. 8, of the cam U, so that the pin v moves up with the same speed as the pivots j. The purpose of this is that the tray may be caused to retain this horizontal position as it moves upward, and thereby cause the cross-heads u to slide up properly into engagement with the guides u'. Fig. 7 shows in dotted lines two extreme upper and lower tilted positions of the tray at which it may enter the guides, and two intermediate positions, and shows it in dotted lines in the act of being lifted horizontally to the final position and in full lines after having been lifted to the level at which the coating is effected.

In the ordinary operation of coating by placing the cores in a tray and then immersing the tray in a bath of chocolate it is necessary to provide a cover or grating of wire over the tray to keep the cores from floating up out of the cells of the tray. In our machine this cover is unnecessary, since we have provided the stationary grating K to serve the same purpose. The cores pass under the grating before they encounter any lifting or buoyant tendency from the chocolate, so that they are restrained by the grating and kept from being lifted out of the tray by the ascending stream of chocolate.

It must not be inferred from the particularity of detail with which we have described the apparatus shown that our invention is by any means limited to the use of these details, since in fact our invention is susceptible of widely-different applications. For example, the arrangement of the movable trays to rotate around a vertical axis is not essential, as any construction by means of which the trays or carriers may be caused to travel past the delivery-nozzle may be employed. Also, instead of a pump for circulating the chocolate or other coating material any other means to that end may be adopted, as, for example, an endless screw, or an elevated reservoir may be filled with chocolate and located at sufficient height to afford the necessary hydrostatic pressure to force the chocolate through the nozzle.

By "nozzle" we mean any suitable delivery-opening through which the chocolate or coating material may flow in a stream for immersing the cores to be coated.

By "tray" we mean any structure adapted to hold the cores or confections to be coated and carry them through the part of the machine where the coating is effected.

By "coating mechanism" we mean any means for forcing a current of coating material into contact with the cores, so that it shall immerse and wholly cover the cores.

We claim as our invention the following-defined novel features, substantially as hereinbefore specified, namely:

1. The process of coating confections which consists in passing the cores while spaced apart to leave passages between them, through a flowing stream of coating material which circulates through said passages and thereby coats all portions of the cores.

2. The process of coating confections which consists in passing the cores while spaced apart to leave passages between them, horizontally through a vertically-flowing stream of coating material.

3. The process of coating confections which consists in passing the cores horizontally while spaced apart to leave passages between them, through an upwardly-flowing stream of coating material, and diverting said stream laterally just above the cores to cause it to flow over and coat the upper sides of the cores.

4. A machine for coating confections comprising a nozzle, means for forcing a stream of coating material through said nozzle, a tray for holding the cores to be coated spaced apart to leave passages between them, and means for carrying such tray transversely across said nozzle and through said stream.

5. A machine for coating confections comprising a nozzle, means for forcing a stream of coating material through said nozzle, a plate for diverting said stream laterally, and means for carrying the cores between the nozzle and plate.

6. A machine for coating confections comprising a nozzle, means for forcing a stream of coating material through said nozzle, two plates between which the stream from said nozzle is confined, and means for carrying the cores between the plates.

7. A machine for coating confections comprising an upturned nozzle, means for forcing a stream of coating material through said nozzle, a plate through which said nozzle opens, a higher plate arranged to divert laterally the stream from said nozzle, and means for carrying the cores between said plates.

8. A machine for coating confections comprising a nozzle, means for forcing a stream of coating material through said nozzle, means for carrying the cores through said stream, and a grating over the path of the cores adapted to prevent the upward displacement of the cores by the coating material.

9. A machine for coating confections comprising a nozzle F, means for forcing a stream of coating material through said nozzle, a deflecting-plate H, a grating K, and means for moving core-carrying trays J between the nozzle F, and the plate H and grating K.

10. A machine for coating confections, comprising a vessel A for the coating material, a pump D, a nozzle F and connecting-pipes, trays J for carrying the cores to be coated, means for moving the trays past said nozzle, and means for collecting the surplus coating material and returning it to said vessel.

11. A machine for coating confections, comprising a vessel A for the coating material, a pump D, a nozzle F and connecting-pipes, trays J for carrying the cores to be coated, a revolving carrier for carrying said trays, and a table beneath said trays for catching the surplus coating material.

12. The combination with a continuously-rotating carrier for a succession of trays J, of means at one point in the endless path of the trays for coating the cores carried by them, and means located subsequently in the path of the trays for repeatedly lifting and dropping said trays to jar off the surplus coating, whereby the trays revolve continuously and are jarred during their travel.

13. The combination of a turn-table, levers carried thereby, trays for holding the cores to be coated, carried by said levers, a coating mechanism for coating the cores as they pass, and a cam having teeth adapted to repeatedly lift and drop said levers and thereby jar the trays, to remove the surplus coating.

14. The combination of a turn-table, levers carried thereby, trays for holding the cores to be coated, carried by said levers, parallel-motion guides engaging said trays at a certain level, a cam engaging said levers for lifting the trays to said level, coating mechanism for coating the cores as they pass around at said level, a cam acting subsequently on said levers for repeatedly lifting and dropping the trays while keeping them within such levels as to be retained under control of said parallel-motion guides, and a cam for finally lowering said levers and trays to free the latter from said guides.

15. The combination of a turn-table, levers carried thereby, trays for holding the cores to be coated, pivoted to said levers, guides for engaging said trays and bringing them to a horizontal position, means for retaining them horizontal, a coating mechanism for coating the cores as they pass around, and a cam for repeatedly lifting and dropping the trays to jar off the surplus coating.

16. The combination of a turn-table, levers M fulcrumed thereto, and having arms $f$, rods $g$ jointed thereto, carried by said turn-table, trays J pivoted to said levers, cam P having inclines P' P$^3$ for acting on said rods $g$ to raise and lower the trays, stops for limiting the descent of the levers, and a coating mechanism for covering the cores with coating material in their passage.

17. The combination of vessel A, revolving table R thereon, turn-table L supported on said table, trays J supported from said turn-table, a pump for drawing coating material from said vessel and forcing it to a nozzle F, and said nozzle arranged to discharge said material into said trays in their passage.

18. The combination of a turn-table, levers M fulcrumed thereto, trays J pivoted to said levers and having cross-heads $u$, brackets T carried by said turn-table and having parallel-motion guides $u'$, guides U V for engaging the trays and bringing them to horizontal positions, and cam P for lifting said levers and thereby lifting the trays until their cross-heads are restrained by said guides $u'$.

In witness whereof we have hereunto signed our names in the presence of two subscribing witnesses.

JOHN R. STOUT.
WILLIS N. HARTSHORN.

Witnesses:
ARTHUR C. FRASER,
GEORGE H. FRASER.